United States Patent
Tomihisa

(10) Patent No.: US 10,216,459 B2
(45) Date of Patent: Feb. 26, 2019

(54) PRINTING SYSTEM FOR PRINTING DATA STORED IN STORAGE DEVICE, AND METHOD FOR CONTROLLING PRINTING SYSTEM, USING A REGISTERED PRINT WORKFLOW TO PRINT SAME DATA MULTIPLE TIMES WITH DIFFERENT PRINT SETTINGS

(71) Applicant: CANON KABUSHIKI KAISHA, Tokyo (JP)

(72) Inventor: Taishi Tomihisa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/792,462

(22) Filed: Jul. 6, 2015

(65) Prior Publication Data

US 2016/0011821 A1    Jan. 14, 2016

(30) Foreign Application Priority Data

Jul. 10, 2014  (JP) .................................. 2014-142728

(51) Int. Cl.
  *G06F 3/12* (2006.01)
  *H04N 1/00* (2006.01)

(52) U.S. Cl.
  CPC .......... *G06F 3/1204* (2013.01); *G06F 3/1257* (2013.01); *G06F 3/1258* (2013.01); *G06F 3/1275* (2013.01); *G06F 3/1286* (2013.01)

(58) Field of Classification Search
  CPC .... G06F 3/1204; G06F 3/1257; G06F 3/1258; G06F 3/1275; G06F 3/1286
  USPC .............. 358/1.1, 1.9, 1.13, 1.14, 1.15, 1.18
  See application file for complete search history.

(56) References Cited

U.S. PATENT DOCUMENTS

| | | | | |
|---|---|---|---|---|
| 2006/0221372 A1* | 10/2006 | Onishi | .................. | G06F 3/1204 358/1.13 |
| 2006/0238794 A1* | 10/2006 | Hada | ..................... | G06F 3/1208 358/1.13 |
| 2009/0316184 A1* | 12/2009 | Ohyama | ............... | G06F 3/1205 358/1.15 |
| 2010/0027045 A1* | 2/2010 | Moore | ............... | G06F 3/04883 358/1.14 |
| 2013/0188221 A1* | 7/2013 | Ohno | .................... | G06F 3/1296 358/1.15 |
| 2014/0029035 A1* | 1/2014 | Maruyama | ............ | G06F 3/1297 358/1.13 |
| 2014/0289667 A1* | 9/2014 | Van Vliembergen | ........................ | G06F 3/04842 715/781 |

(Continued)

FOREIGN PATENT DOCUMENTS

| | | |
|---|---|---|
| JP | H10322487 A | 12/1998 |
| JP | 2006127297 A | 5/2006 |
| JP | 2006166266 A | 6/2006 |

(Continued)

*Primary Examiner* — Gabriel Garcia
(74) *Attorney, Agent, or Firm* — Canon U.S.A., Inc. IP Division

(57) ABSTRACT

A printing system for printing data stored in a storage device includes a registration unit that registers a plurality of different print settings as one workflow, a specifying unit that specifies the registered workflow with respect to the stored data, and a generation unit that generates, according to the specified workflow, a plurality of print jobs, to which the different print settings are reflected, with respect to the data.

21 Claims, 17 Drawing Sheets

(56) References Cited

U.S. PATENT DOCUMENTS

2015/0373118 A1\* 12/2015 Ganesan ............... G06F 3/1203
  358/1.15

FOREIGN PATENT DOCUMENTS

| JP | 2006-301964 A | 11/2006 |
| JP | 2008112333 A | 5/2008 |
| JP | 2008310445 A | 12/2008 |
| JP | 2012128518 A | 7/2012 |

\* cited by examiner

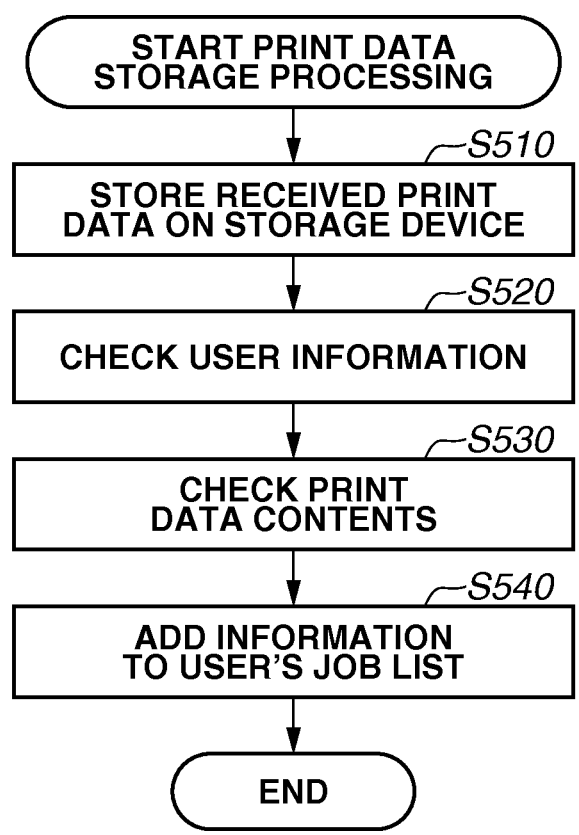

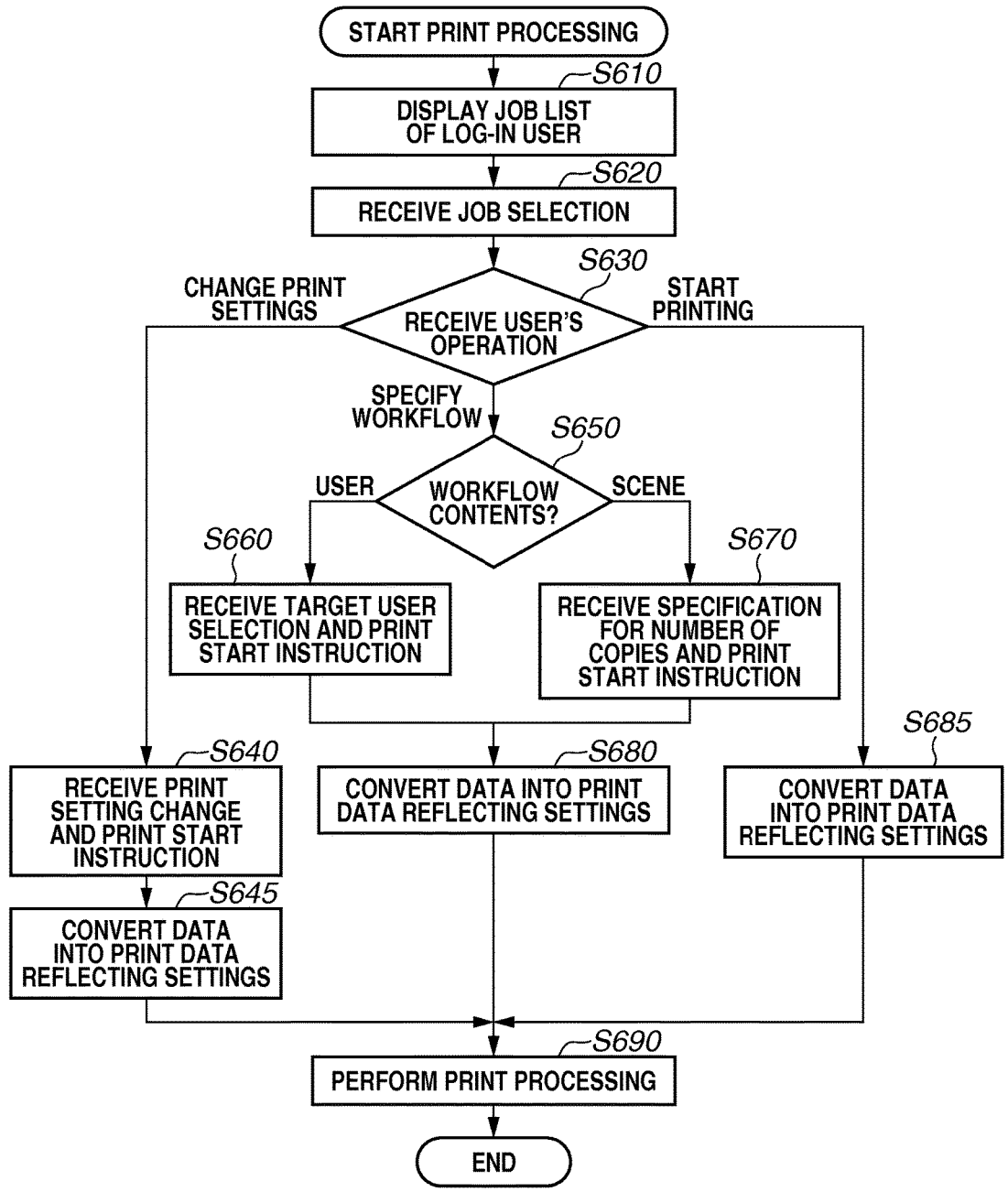

FIG.9A

| | FILE NAME | COLOR MODE | ONE-SIDED/ TWO-SIDED | PAGE/ COPIES | DATE/TIME |
|---|---|---|---|---|---|
| ✓ | PROGRESS REPORT.doc | COLOR | ONE-SIDED | 6 PAGE/ 1 COPY | 2011/1/8 10:00:00 |
| | BUSINESS MEETING MATERIAL.pdf | COLOR | ONE-SIDED | 2 PAGE/ 1 COPY | 2011/1/8 10:03:00 |
| | BUSINESS MEETING REFERENCE MATERIAL.xls | COLOR | ONE-SIDED | 6 PAGE/ 1 COPY | 2011/1/8 10:05:00 |

PRINT — LOG OUT
USER A  SELECT PRINT JOB AND SPECIFY PROCESSING.

Buttons: SELECT ALL | CLEAR SELECTION | PRINT (REGULAR) | PRINT (BUSINESS MEETING) | PRINT SETTINGS | DELETE JOB | START PRINTING

FIG.9B

PRINT SETTINGS — LOG OUT
USER A  CHECK PRINT SETTING CONTENTS.

| | |
|---|---|
| NUMBER OF COPIES | 1  (1~9999) |
| COLOR MODE | COLOR / BLACK AND WHITE |
| ONE-SIDED/TWO-SIDED | ONE-SIDED / TWO-SIDED |
| PAGE LAYOUT | 1 in 1 |
| STAPLING | NONE |
| PRINT QUALITY | ECO-PRINT / NORMAL QUALITY / HIGH QUALITY |

CANCEL | START PRINTING

FIG.11

| PRINT SETTINGS | PRIORITY ORDER |
|---|---|
| COLOR MODE | 2 |
| ONE-SIDED/TWO-SIDED | — |
| PAGE LAYOUT | 1 |
| STAPLING | — |
| PRINT QUALITY | — |

FIG.12

| USER NAME | PAGE LAYOUT | COLOR MODE | PROCESSING ORDER |
|---|---|---|---|
| USER A | 1 in 1 | COLOR | 1 |
| USER B | 2 in 1 | BLACK AND WHITE | 4 |
| USER C | 1 in 1 | BLACK AND WHITE | 2 |
| USER D | 1 in 1 | BLACK AND WHITE | 3 |

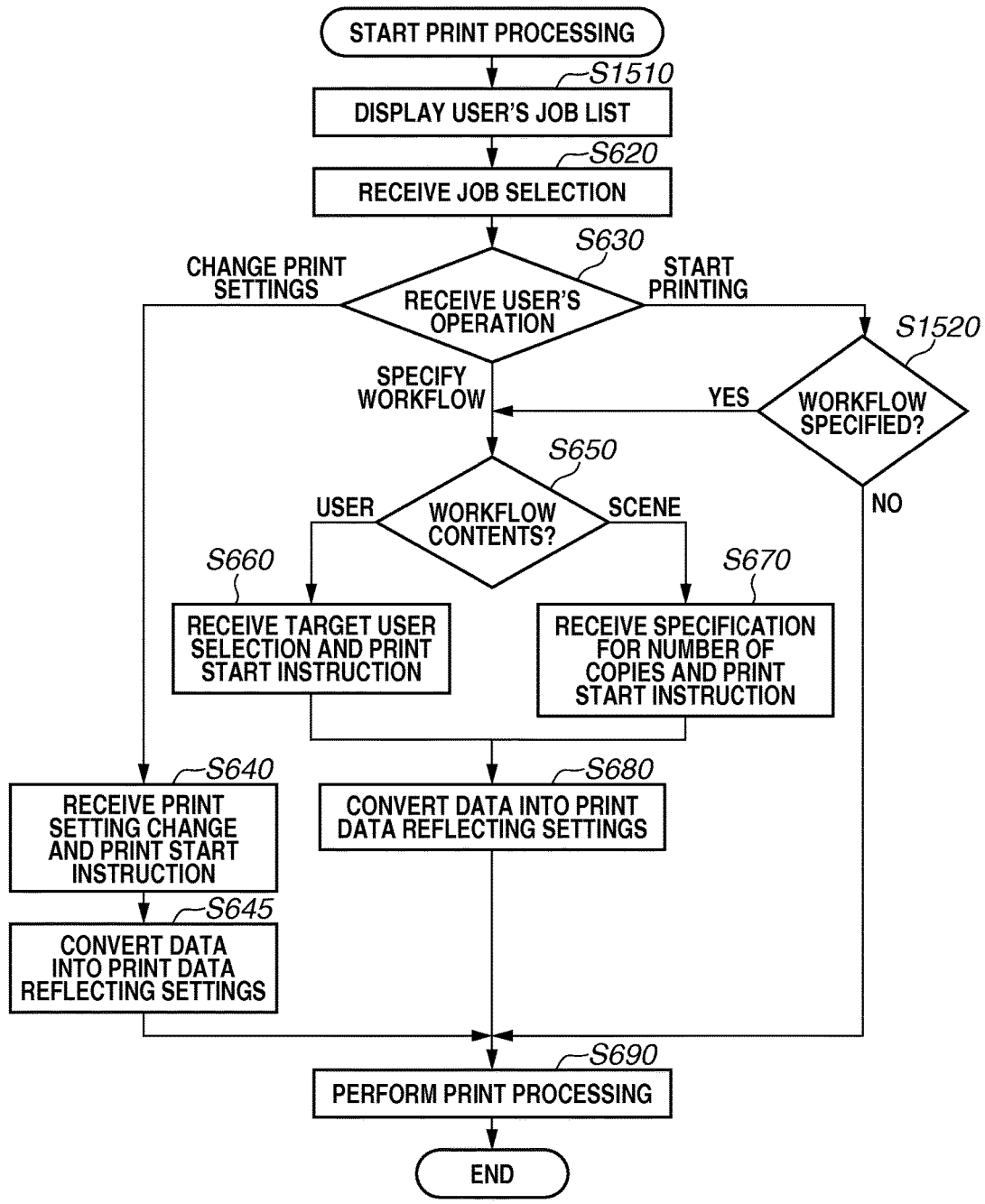

PRINTING SYSTEM FOR PRINTING DATA STORED IN STORAGE DEVICE, AND METHOD FOR CONTROLLING PRINTING SYSTEM, USING A REGISTERED PRINT WORKFLOW TO PRINT SAME DATA MULTIPLE TIMES WITH DIFFERENT PRINT SETTINGS

BACKGROUND

Field

Aspects of the present invention generally relate to a printing system capable of printing data stored in a storage device according to a print instruction given by a user.

Description of the Related Art

In recent years, with network environments becoming widely available, sharing of a plurality of printers among a plurality of users has become more common. As a result, the demand for authentication printing, in which printing is executed after a printer performs user authentication, in outputting a highly-confidential print product, has been increasing. For example, a technique for temporarily storing print data on a storage area in a printer or a server, and after a user has been authenticated by a desired printer, displaying a print job list of the user, and executing the printing of the print data specified by the user has been proposed.

Japanese Patent Application Laid-Open No. 2006-301964 discusses the following printing system. The most favorite print settings for users vary depending on the users. Consequently, in the printing system, favorite print settings (N in 1 printing, one-sided/two-sided printing, or the like) are registered in advance for each user. When a user performs printing, the favorite settings are called in response to the operation by the user of the printer, and print output is performed according to the favorite settings.

Meanwhile, when printing accumulated data, in some cases, the user may want to output a plurality of print products in different print settings.

For example, for the use of distributing the print products to other people, the print output is to be performed in the settings of color, and 1 in 1, and for the user's own use, the print output is to be performed in the settings of black and white, and 4 in 1.

In such a case, in the known favorite setting registration and calling method, when the printing is performed, the user has to perform the print setting operation a plurality of times onto the same data, which is troublesome.

SUMMARY

Aspects of The present invention are generally directed to a printing system enabling output of a plurality of print products with a simple operation when printing is performed.

According to an aspect of the present invention, a printing system for printing data stored in a storage device includes a registration unit configured to register a plurality of different print settings as one workflow, a specifying unit configured to specify the registered workflow with respect to the stored data, and a generation unit configured to generate, according to the specified workflow, a plurality of print jobs for printing the data in accordance with the different print settings.

According to the present disclosure, in performing printing, a plurality of print products according to different print settings can be output with simple operation.

Further features of the present disclosure will become apparent from the following description of exemplary embodiments with reference to the attached drawings.

BRIEF DESCRIPTION OF THE DRAWINGS

FIG. 5 is a flowchart illustrating processing when a printing apparatus receives data.

FIG. 6 is a flowchart illustrating processing when a printing apparatus performs printing.

FIGS. 9A, 9B, 9C, and 9D illustrate an example of a registration screen for specifying a print workflow from a job list.

FIG. 11 illustrates an example of a print setting priority order list.

FIG. 12 illustrates an example of print settings in each favorite print setting and their processing order.

FIG. 15 is a flowchart illustrating processing for print processing according to the second exemplary embodiment.

DESCRIPTION OF THE EMBODIMENTS

Hereinafter, exemplary embodiments will be described with reference to the attached drawings.

<Print System>

Figure 1:
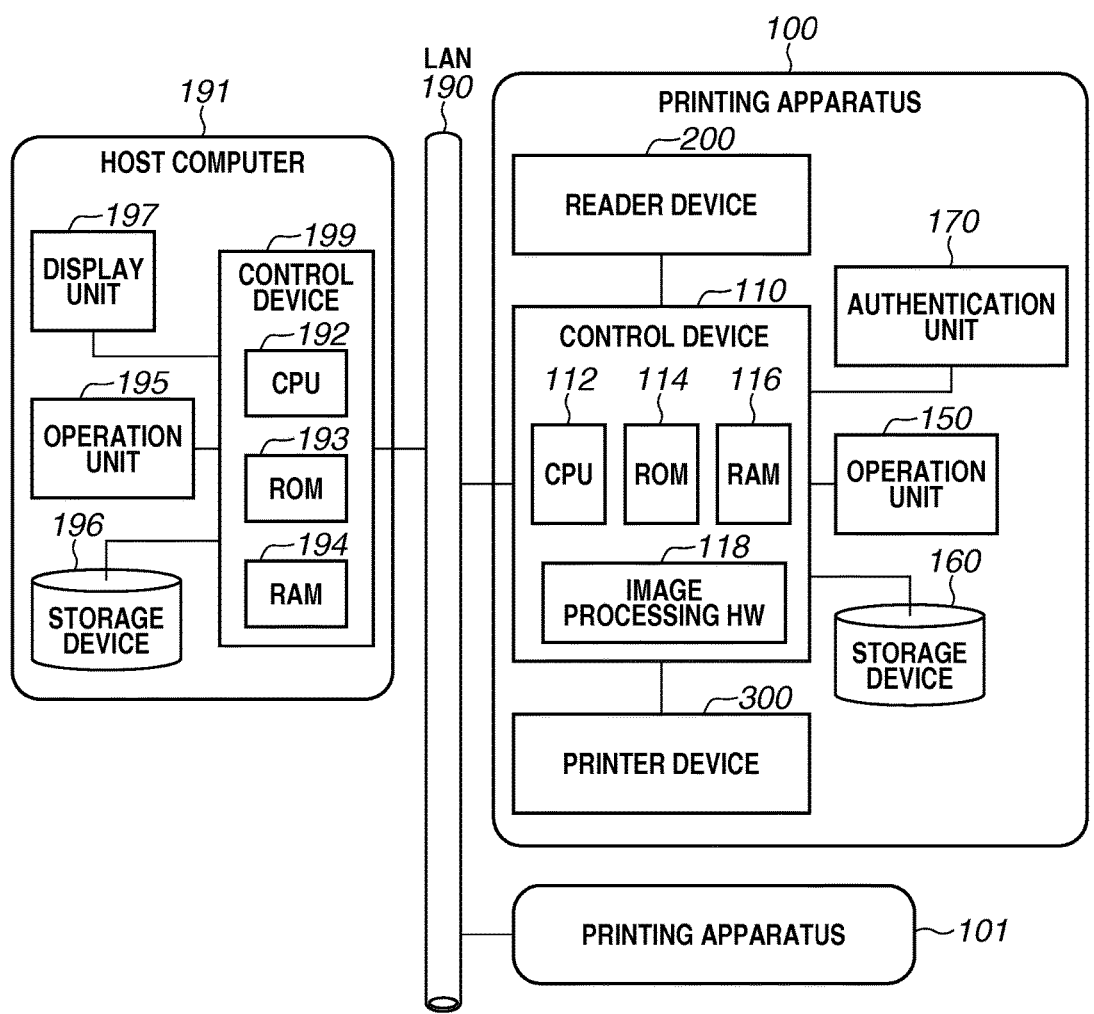
FIG. 1 illustrates an overall configuration of a printing system.

FIG. 1 illustrates an overall configuration of a printing system. In the printing system in FIG. 1, a printing apparatus 100, a printing apparatus 101, and a host computer 191 are communicably connected via a local area network (LAN) 190 such as Ethernet®.

The printing apparatus 100 includes a reader device 200, a printer device 300, an operation unit 150, a storage device 160, an authentication unit 170, and a control device 110 that controls these components. The control device 110 includes a central processing unit (CPU) 112, a read-only memory (ROM) 114, a random access memory (RAM) 116, and an image processing hardware (image processing HW) 118. The CPU 112 controls the printing apparatus 100 according to a program stored in the ROM 114, the image processing HW 118, or other storage media. The RAM 116 also serves as a work area of the CPU 112.

The reader device 200 reads image data according to an instruction of the control device 110. The printer device 300 outputs image data using a printer engine according to an instruction of the control device 110. The operation unit 150 includes operation keys for users to perform an operation, and a liquid crystal panel for displaying and setting image data and various functions. The operation unit 150 notifies the control device 110 of the user's operation information. The storage device 160 serves as a work area of the CPU 112, and further can temporarily store print data. The authentication unit 170 is, for example, a card reader. The authentication unit 170 receives user authentication information via an ID card, and notifies the control device 110 of the user authentication information.

The host computer 191 includes an operation unit 195, a storage device 196, a display unit 197, and a control device 199 that controls these components. The control device 199 includes a CPU 192, a ROM 193, and a RAM 194. The CPU 192 controls the host computer 191 according to an operating system program (hereinafter, referred to as "OS") that is a control program stored in the ROM 193 or other storage media. The RAM 194 also serves as a work area of the CPU 192. The operation unit 195 includes a keyboard and a mouse for users to perform an operation. The operation unit 195 notifies the control device 199 of the user's operation information. The storage device 196 serves as a work area of the CPU 192, and further can store data. The display unit 197 includes a liquid crystal display, and displays a result of the execution of a program by the CPU 192.

Hereinafter, user log-in processing by the printing apparatus 100 is described. In response to the input of user authentication information into the authentication unit 170 by a user, the input user authentication information is transmitted to the control device 110. The CPU 112 collates the user authentication information with the user information registered in advance, and determines whether to permit the user to use the printing apparatus 100. If the use is not permitted, the CPU 112 performs error display indicating the failure of the user authentication on the liquid crystal panel of the operation unit 150, and prompts the user to input information again. The user information registered in advance is stored in the RAM 116 or the storage device 160 in the printing apparatus 100.

The user information stored in advance may be stored in a storage device in an external authentication server. Further, the determination processing may be performed in the external authentication server. The following operation of the printing apparatus 100 is described on the assumption that the log-in processing of the user has been performed, and the use of the printing apparatus 100 has been permitted.

In the above-described printing system, the printing apparatus 100 performs the following processing. The printing apparatus 100 temporarily stores the print data transmitted from the host computer 191 in the storage device 160, performs the user log-in processing, and displays a list of the print data on the operation unit 150. Then, in a state where a print job to be started is selected by the log-in user via the operation unit 150, the printing apparatus 100 receives an selection operation of a button for the print workflow described below. According to a plurality of favorite print settings associated in advance with the selected print workflow, the printing apparatus 100 generates a plurality of pieces of print data in different print settings, and performs output of the print products. In the description below, the processing for registering a print workflow and printing according to the print workflow will be described in detail.

Figure 2:
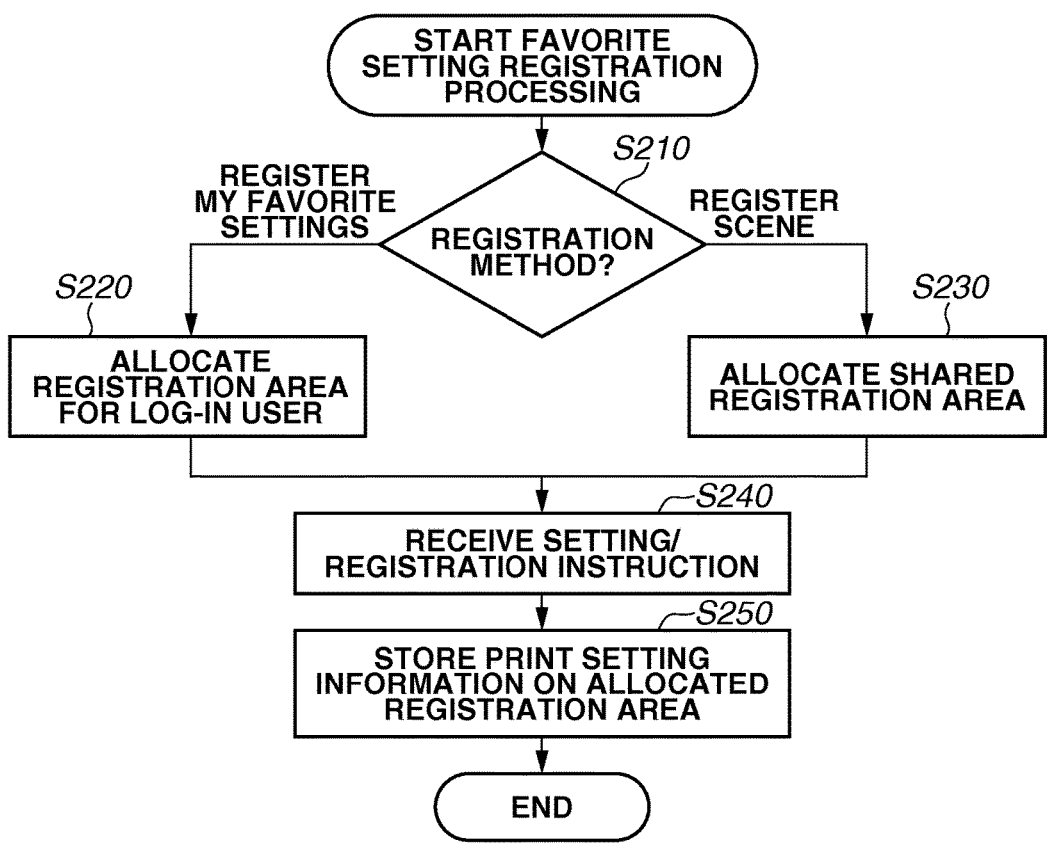
FIG. 2 is a flowchart illustrating processing for registering favorite print settings.

FIG. 2 is a flowchart illustrating processing for registering favorite print settings for each user or each scene, according to a first exemplary embodiment. Each step illustrated in the flowchart in FIG. 2 is implemented by the CPU 112 in the printing apparatus 100, executing a program read from the ROM 114 and loaded onto the RAM 116.

In step S210, the CPU 112 displays a screen for selecting a favorite registration method on the operation unit 150, and receives a selection operation of a favorite registration method from a user (log-in user) logging in the printing apparatus 100.

Figure 7A:
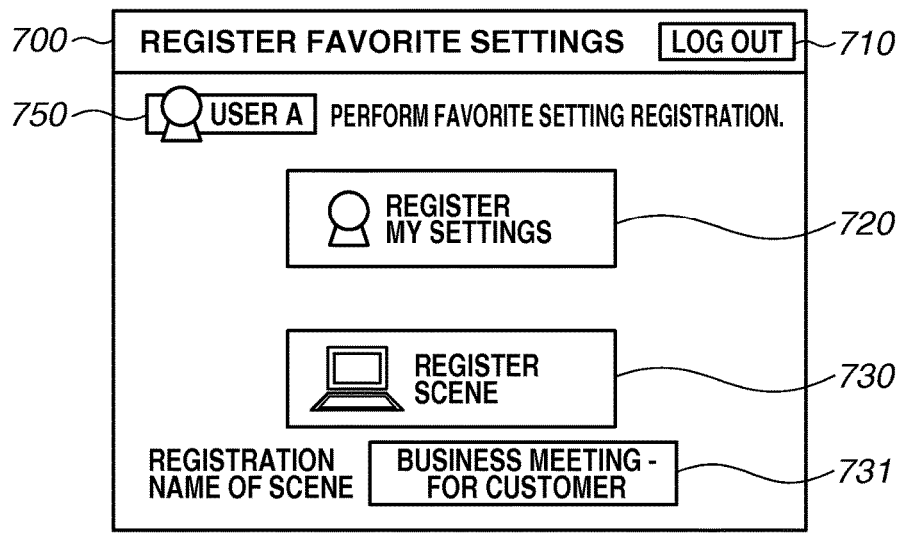
FIGS. 7A and 7B illustrate an example of a registration screen for registering favorite print settings.

FIG. 7A illustrates an example of a screen displayed on the operation unit 150 in step S210. On the screen in FIG. 7A, in a user name display area 750, a user name of the user logging in the printing apparatus 100 is displayed. A log-out specifying button 710 is used to perform log-out processing of the log-in user.

On the screen in FIG. 7A, a personal registration specifying button 720, a scene registration specifying button 730, and a scene registration name input area 731 are further displayed. Upon detecting a touch to the personal registration specifying button 720, the CPU 112 determines that a method for registering favorite print settings for each user has been selected (REGISTER MY FAVORITE SETTINGS in step S210). Then, the processing proceeds to step S220.

On the other hand, upon detecting a touch to the scene registration specifying button 730, the CPU 112 determines that a method for registering favorite print settings for each scene has been selected (REGISTER SCENE in step S210). Then, the processing proceeds to step S230.

In step S220, the CPU 112 allocates, as a registration area for the favorite print settings, a registration area for the log-in user in the RAM 116 or the storage device 160. Then, the processing proceeds to step S240.

In step S230, the CPU 112 allocates, as a registration area for the favorite print settings, a registration area to be shared in the RAM 116 or the storage device 160. Then, the processing proceeds to step S240.

Figure 7B:
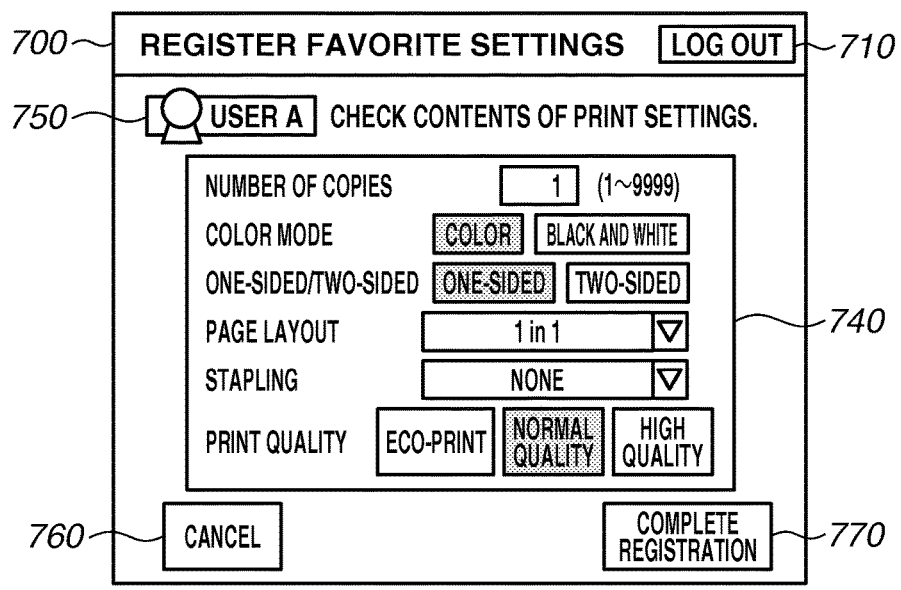

In step S240, the CPU 112 displays a print setting screen illustrated in FIG. 7B on the operation unit 150, and receives, from the log-in user, an operation for registering favorite print settings corresponding to the log-in user. On the print setting screen in FIG. 7B, in a display area 740, information of the print settings that can be processed by the printing apparatus 100 is displayed. The user touches buttons in the display area 740 to select various kinds of print settings, and then touches a registration completion button 770 to issues an instruction for registering the favorite print settings. The favorite print settings include, for example, settings for a color mode, one-sided/two-sided, a page layout, and print quality. If the user selects a cancel button 760, the registration processing is canceled, and the screen transitions to the screen in FIG. 7A or a screen previous to the screen.

In step S250, the CPU 112 stores the information (for example, a color mode, one-sided/two-sided, a page layout, and print quality) of the favorite print settings in the registration area allocated in step S220 or step S230, and ends the processing of this flowchart.

with the processing in FIG. 2, the processing for storing favorite print settings for each user or each scene is completed.

Figure 3:
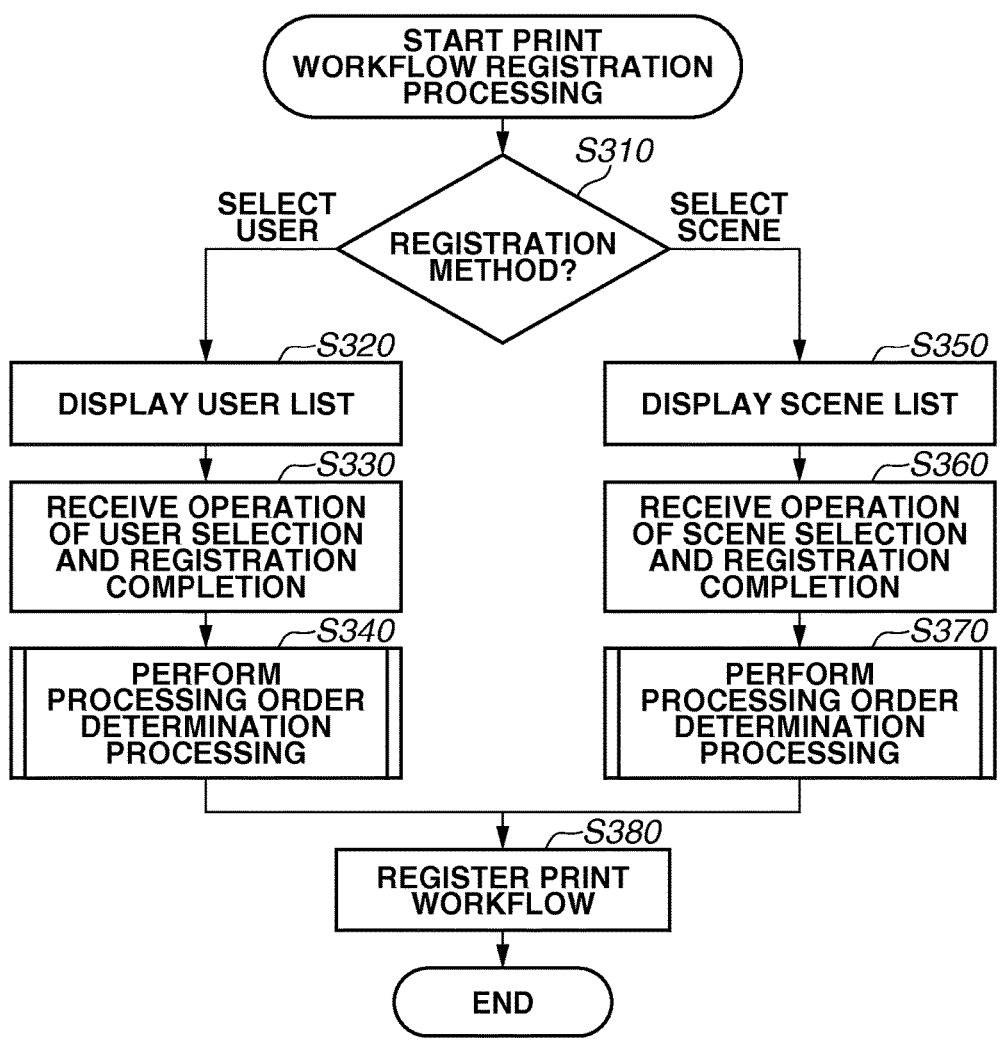
FIG. 3 is a flowchart illustrating processing for registering a print workflow.

FIG. 3 is a flowchart illustrating processing for registering a print workflow in a state where the information of the favorite print settings for each user or each scene is stored. Each step illustrated in the flowchart in FIG. 3 is implemented by the CPU 112 in the printing apparatus 100, executing a program read from the ROM 114 and loaded onto the RAM 116.

Figure 8A:
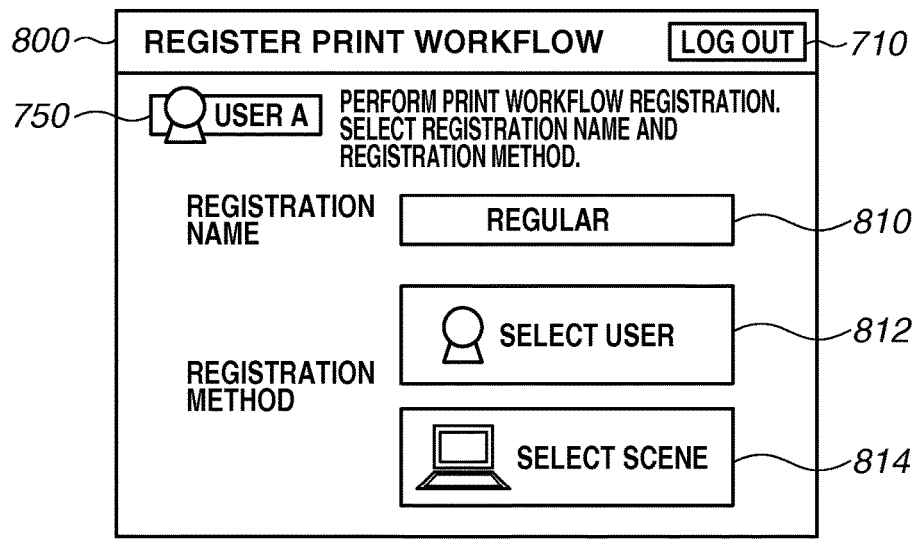
FIGS. 8A, 8B, and 8C illustrate an example of a registration screen for registering a print workflow.

In step S310, the CPU 112 displays a screen illustrated in FIG. 8A on the operation unit 150, and receives, from the log-in user, an operation for registering a print workflow. More specifically, the CPU 112 inputs a name of a print workflow to be registered, in an input area 810 according to an instruction of the log-in user. In the example of FIG. 8A, the name "REGULAR" is input as the name of the print workflow.

Then, the CPU 112 receives a specification of a method for registering the print workflow. In the present exemplary embodiment, the method for registering the print workflow includes two kinds of methods. One method is to select a user and register a print workflow. The other method is to select a scene and register a print workflow.

In step S310, if the CPU 112 detects a touch to a user selection button 812 on the screen in FIG. 8A, the CPU 112 determines that a method for selecting a user and registering a print workflow is specified (SELECT USER in step S310). Then, the processing proceeds to step S320.

On the other hand, if the CPU 112 detects a touch to a scene selection button 814, the CPU 112 determines that a method for selecting a scene and registering a print workflow is specified (SELECT SCENE in step S310). Then, the processing proceeds to step S350.

Figure 8B:
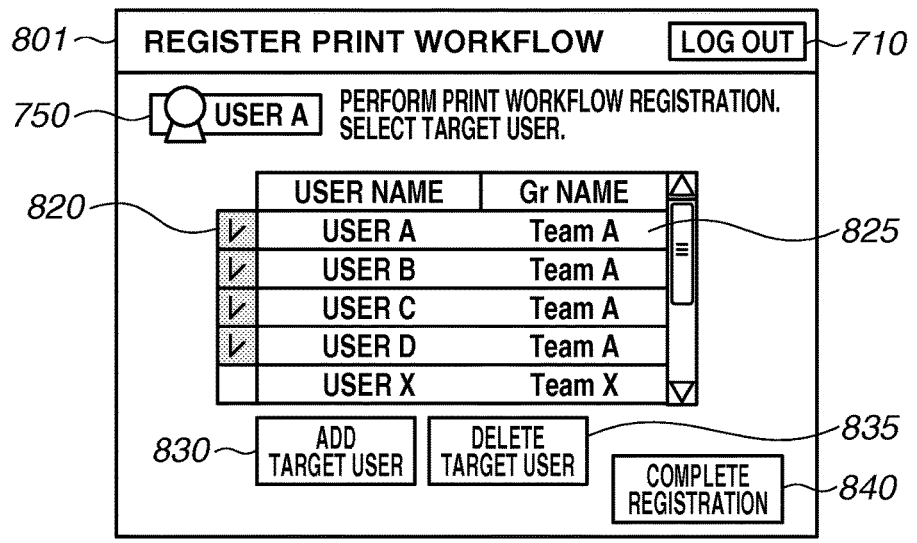

In step S320, the CPU 112 reads the information of the favorite print settings associated with the users, stored in the storage device 160, and displays a user list illustrated in FIG. 8B on the operation unit 150. In a display area 825 in FIG. 8B, names of the users whose favorite print settings are registered, and names of groups to which the users belong are displayed.

A user selection button 820 is used to select a target user in the print workflow. The display is provided in such a manner that a currently selected user can be recognized. Selecting a user addition button 830 or a user deletion button 835 enables addition of a user to be displayed on the user list or deletion of a user listed on the user list, respectively. The CPU 112 may display, based on the information of the log-in user, the user list in a state in which the members of the group the user belongs to are selected in advance as an initial state.

In step S330, the CPU 112 receives an operation of selection of users to be registered, via the user selection button 820, and an operation of the registration completion via a registration completion button 840 from the user.

In step S340, the CPU 112 collects the favorite print settings for each user selected in step S330, and performs the processing for determining a processing order.

Figure 10:
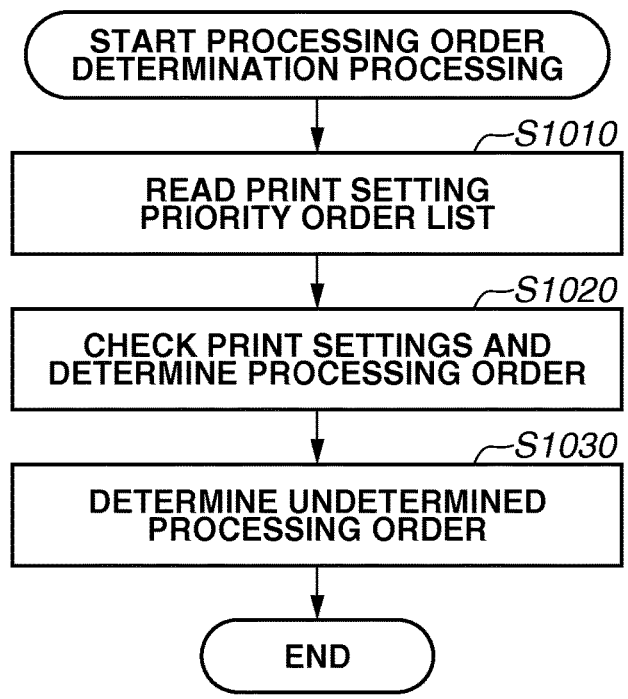
FIG. 10 is a flowchart illustrating processing of order determination processing.

FIG. 10 is a flowchart illustrating the processing in step S340 or S370 in detail.

In step S1010, the CPU 112 reads a print setting priority order list. FIG. 11 illustrates an example of the print setting priority order list. The list includes print settings that can be changed, and the information indicating which print setting is to be prioritized. In this example, from a print setting having a larger processing load in data conversion due to print setting change, an order of "PAGE LAYOUT", and "COLOR MODE" is allocated. Other print settings have very small loads, and thus "–" (if it is to be expressed only by numeric values, a value such as zero that is considered to be invalid can be input) is given to indicate that it is not necessary to particularly take those print settings into account.

In step S1020, the CPU 112 calculates differences between the favorite print settings registered in the print workflow, and according to the order of priority in the list read in step S1010, sorts the print settings in the decreasing order of size of print data after the execution of the conversion. FIG. 12 illustrates a list of print settings, which are to be taken into account, in the favorite print settings of the users, and a result of the priority orders. First, the settings of the page layout at higher priority are checked, and the user B of the setting of 2 in 1 is ranked forth, which is the last in the order of the processing. Then, the settings of the color mode are checked, and the user A of the setting of color is ranked first, which is the earliest in the order of the processing. Normally, if the contents of the print data are the same, the amount of print data information of color is larger than that of black and white, and the amount of print data information in 1 in 1 is larger than that in 2 in 1. Consequently, the processing order is determined as described above.

In step S1030, the CPU 112 determines the order of processing of the print settings that have not been determined in step S1020, and ends the processing. In the present exemplary embodiment, based on the information of the user names, the order of processing is determined in the order of the user C, and the user D. With respect to the print settings determined in step S1010 that it is not necessary to be taken into account, print settings as similar as possible to the immediately preceding settings of the user A may be selected.

Figure 8C:
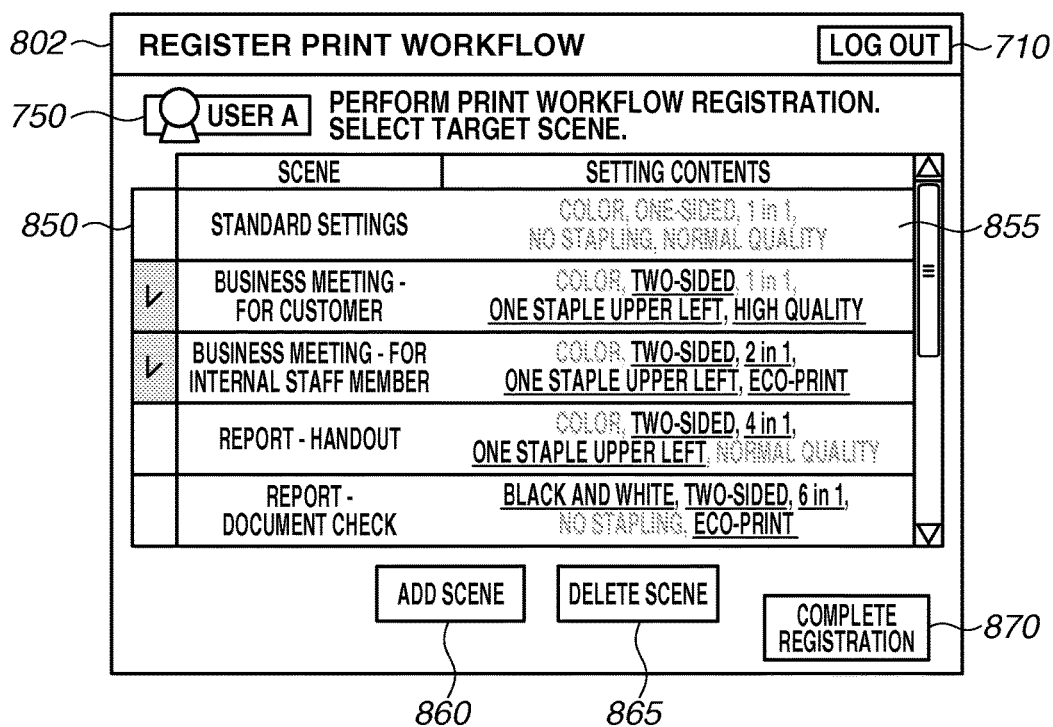

In step S350, the CPU 112 reads the information of the favorite print settings for each scene, stored in the storage device 160, and displays a scene list for selecting a target scene to be associated with the print workflow, on the operation unit 150. FIG. 8C illustrates an example of the scene list. In FIG. 8C, in a display area 855, scene names and print settings for each scene are displayed. A scene selection button 850 is used to select a target scene to be registered as the print workflow, and the button is displayed in such a manner that a currently selected scene can be recognized. By selecting a scene addition button 860, or a scene deletion button 865, a scene can be added to the displayed list or a scene can be deleted from the displayed list, respectively. The CPU 112, based on standard settings (for example, initial settings of the printing apparatus), may emphasize and display different print settings, and may display print settings that are not different in a light color to ease the recognition of the difference in the settings of the scenes, for example.

In step S360, if the CPU 112 detects selection of a target scene via the scene selection button 850, and a touch to a registration completion button 870, the processing proceeds to step S370.

In step S370, the CPU 112 collects the favorite print settings for each scene selected in step S360, and performs the processing for determining a processing order. The contents of the processing order determination processing are similar to those in step S340 other than a point that the favorite print settings are associated with which of a user or a scene, and accordingly, their descriptions are omitted.

In step S380, the CPU 112 stores the information of the print workflow in the RAM 116 or the storage device 160 in the printing apparatus 100.

The information of the print workflow is obtained by merging the information of the favorite print settings selected in step S330. Alternatively, the information of the print workflow is obtained by merging with the information of the favorite print settings selected in step S360.

For example, when the user A, the user B, the user C, and the user D are selected in step S330, the favorite print settings for the user A, the user B, the user C, and the user D are acquired from the storage device 160, respectively. Then, the information of the favorite print settings is merged to generate a new file, and the file is stored in the storage device 160 as the information of the print workflow. The information of the print workflow may be stored in an external device such as a server.

Figure 4:
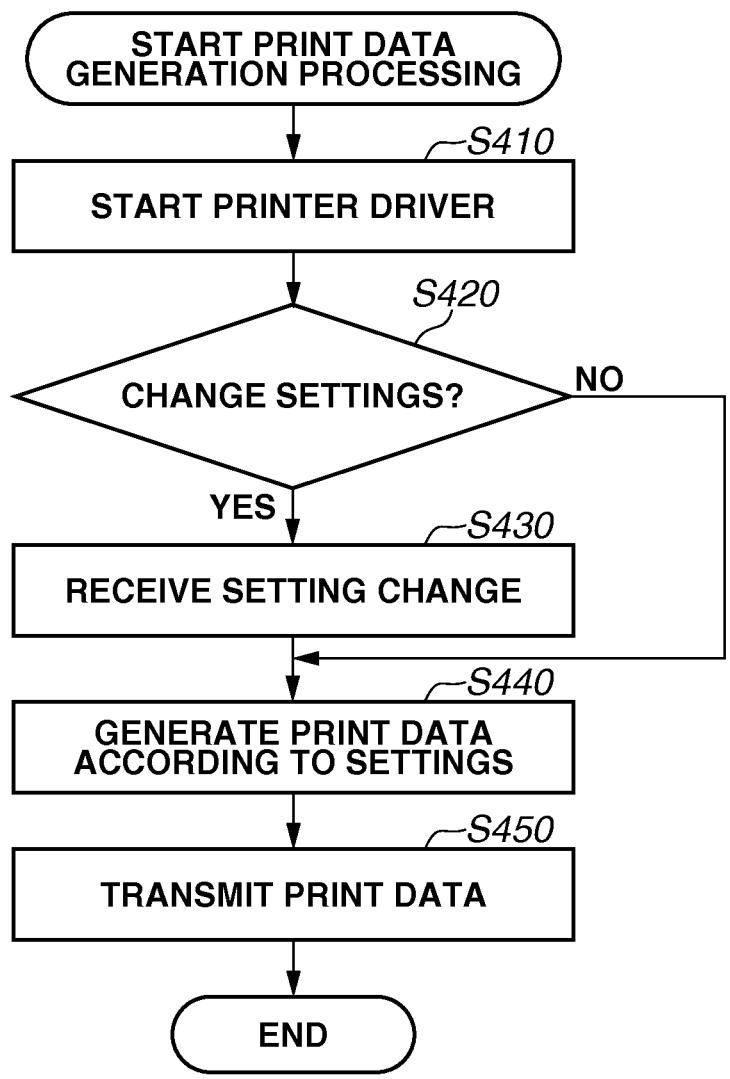
FIG. 4 is a flowchart illustrating processing when a host computer transmits data.

FIG. 4 is a flowchart illustrating processing when the host computer 191 transmits data. Each step illustrated in the flowchart in FIG. 4 is implemented by the CPU 192 in the host computer 191, executing a program read from the ROM 193 and loaded onto the RAM 194.

In step S410, the CPU 192 receives a print instruction from the user via an application, and starts a printer driver. In this processing, the CPU 192 reads initial values of print settings and image processing settings.

In step S420, the CPU 192 displays a screen (not illustrated) of the printer driver on the display unit 197, and receives from the user an operation for selecting whether to perform change in various kinds of settings such as the print settings and the image processing settings, or to perform print execution without changing the print settings. If the setting change is performed (YES in step S420), the processing proceeds to S430. On the other hand, if the setting change is not performed (NO in step S420), the processing proceeds to step S440.

In step S430, the CPU 192 receives from the user an operation for changing various kinds of settings such as the print settings and the image processing settings. In this processing, the initial values of the various kinds of settings read in step S410 are displayed on the display unit 197 in a state where the values are set on a UI of the printer driver.

In step S440, the CPU 192 receives a print instruction that is noticed from the application via the OS, and generates print data according to the various settings. The print data generated in this processing includes embedded user information for identifying the users.

In step S450, the CPU 192 transmits the print data to the printing apparatus 100 via the LAN 190, and ends the processing.

FIG. 5 is a flowchart illustrating processing when the printing apparatus 100 receives the data. Each step illustrated in the flowchart in FIG. 5 is implemented by the CPU 112 in the printing apparatus 100, executing a program read from the ROM 114 and loaded into the RAM 116.

The processing is described below on the assumption that the print data is stored in the printing apparatus 100. Alternatively, a server for storing print data may be separately provided, and the print data may be stored in the server.

In step S510, the CPU 112 receives the print data transmitted from the host computer 191 via the LAN 190, and stores the received print data in the storage device 160.

In step S520, the CPU 112 checks, based on the print data stored in step S510, the user information embedded in step S440.

In step S530, the CPU 112 checks, based on the print data stored in step S510, the information for identifying the print data, such as the name of the print data and print settings.

In step S540, the CPU 112, generates, based on the user information checked in step S520, a print job list of the user, registers the jobs, stores the information of the jobs in the storage device 160, and ends the processing.

The print job list includes the information of the print data names and various kinds of print settings checked in step S530, and paths of the print data stored in step S510 in the storage device 160. If the print job list of the user has already been provided, the information is added and registered at the end of the print job list.

FIG. 6 is a flowchart illustrating processing when the printing apparatus 100 performs printing. Each step illustrated in the flowchart in FIG. 6 is implemented by the CPU 112 in the printing apparatus 100, executing a program read from the ROM 114 and loaded into the RAM 116.

In step S610, the CPU 112 displays a print job list of the authenticated user on the operation unit 150. FIG. 9A illustrates an example of the print job list. On a screen 900 in FIG. 9A, in a display area 915, information such as a file name, a color mode, one-sided/two-sided, page/copies, and date/time is displayed as the information showing the outline of the print job for the user. A job selection button 910 is used to select a job. The display is provided in such a manner that the user can recognize a currently selected print job. A select all button 920 for selecting all print jobs displayed on the print job list, and a selection clear button 922 for clearing all jobs currently selected are used to help the operation of the user. A job deletion button 926 for deleting an unnecessary print job is also displayed. In addition, a print setting button 924, print workflow buttons 930 and 935, and a print start button 940 are displayed.

In the present exemplary embodiment, the print workflow buttons 930 and 935 enable specification of a workflow for a selected job (data), respectively. The display of the print workflow buttons 930 and 935 on the screen enables the log-in user to generate a plurality of print jobs to which different print settings are reflected with a simple operation.

In the present exemplary embodiment, the print workflow button 930 is used to output a plurality of print products used in a regular meeting. The participants of the regular meeting are the user A, the user B, the user C, and the user X, and each user has different favorite print settings. Thus, favorite print settings of each user are merged and registered as a print workflow in advance. This enables an output of the print products according to the print settings corresponding to the plurality of users by simply touching the print workflow button 930 on the screen in FIG. 9A.

In the present exemplary embodiment, the print workflow button 935 is used to output a print product used in a specific business meeting. In the present exemplary embodiment, it is assumed that materials distributed to the customer and materials for internal staff members in the specific business meeting can be output with different print settings, respectively. Consequently, as a workflow for outputting the print products used in the business meeting, print settings for the materials distributed to the customer, and print settings for the materials for the internal staff members are registered. In performing the printing, the materials distributed to the customer and the materials for the internal staff members can be easily output with the different settings by simply touching the print workflow button 935 on the screen in FIG. 9A.

In step S620, the CPU 112 receives from the log-in user an operation of the job selection button 910 to select one or more print jobs from the print job list. The display area 825 may also serve as the job selection button 910.

In step S630, the CPU 112 receives an operation of the log-in user. If the print setting button 924 is selected (CHANGE PRINT SETTINGS in step S630), the processing proceeds to step S640. If the print workflow button 930 or 935 is selected (SPECIFY WORKFLOW in step S630), the processing proceeds to step S650. If the print start button 940 is selected (START PRINTING in step S630), the processing proceeds to step S685.

In step S640, the CPU 112 receives from the user an operation for final check of the print settings and a change instruction. FIG. 9B illustrates a screen for displaying the contents of the print settings for final check of the print settings. In a display area 950 in FIG. 9B, of the print settings set by the host computer 191, the information of the print settings that can be changed with the operation unit 150 is displayed.

The user selects and changes the print settings with the buttons in the display area 950, and issues a print instruction with a print start button 940. If the user selects a cancel button 945, the registration processing is canceled, and then, the screen transitions to the screen in FIG. 9A and the processing returns to step S610. However, the flow thereof is not illustrated in FIG. 6, and the subsequent processing is not described.

In step S645, the CPU 112 converts the print settings of the print data based on the instruction for print setting change specified in step S640.

The processing in step S650 is performed when the print workflow button is touched while a print target job is selected. In step S650, the CPU 112 checks the contents of the print workflow selected by the user. If the selected workflow is a workflow generated by merging favorite print settings for a plurality of users and registering the merged settings (USER in step S650), the processing proceeds to step S660. If the selected workflow is a workflow generated by merging favorite print settings for a plurality of scenes and registering the merged settings (SCENE in step S650), the processing proceeds to step S670.

In step S660, the CPU 112 displays a check screen of the user list of the print workflow, and waits for an instruction from the log-in user. In response to a reception of an instruction for starting the printing, the CPU 112 issues an instruction to start the printing.

Figure 9C:
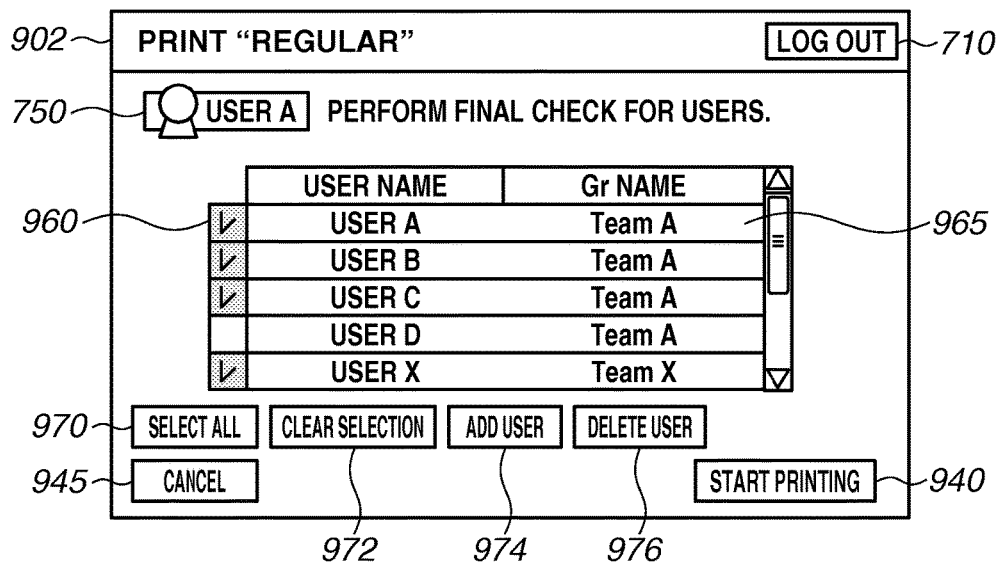

FIG. 9C illustrates an example of a screen displayed in step S660. In a display screen 902 in FIG. 9C, user names and group names to which the users belong are displayed. User selection buttons 960 are displayed in such a manner that the user can visually identify users currently selected. The user selects users to be registered with the user selection buttons 960, and issues a print instruction with the print start button 940. The user can add a user to be displayed on the list using a user addition button 974, and can delete a user displayed on the list using a user deletion button 976. When a target user change is performed, the processing order determination processing is performed, and the processing order is updated taking the updated user into account.

Figure 9D:
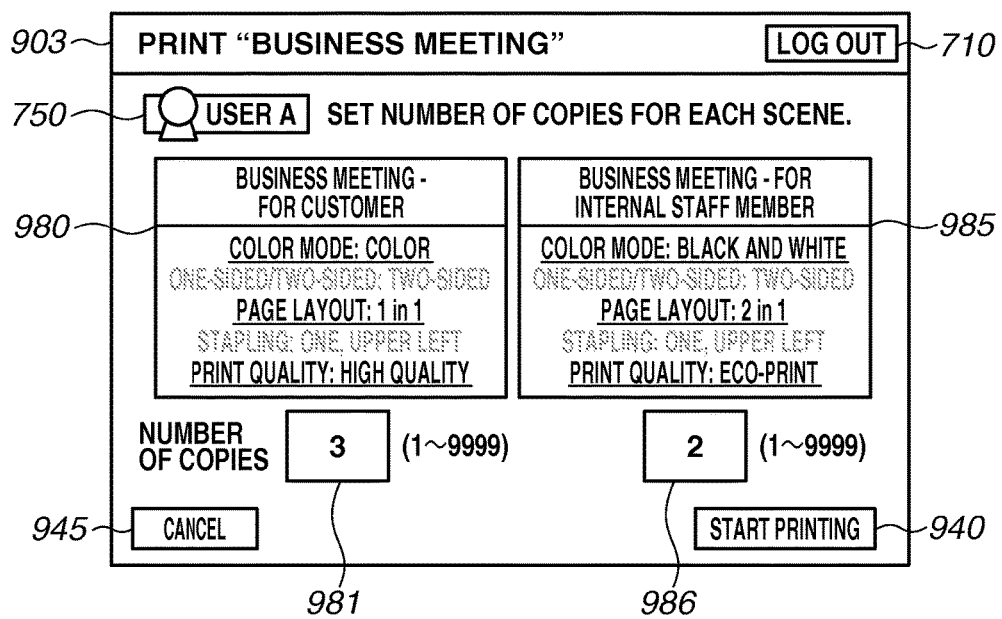

In step S670, the CPU 112 displays a print setting screen for each scene associated with the print workflow. The user specifies the number of copies in each scene, and issues an instruction to start the printing. FIG. 9D illustrates an example of the screen displayed in step 670. In FIG. 9D, in display areas 980 and 985, the information of the print settings in each scene is displayed. Further, number of copies specifying buttons 981 and 986 associated with respective scenes is displayed. In this processing, for allowing the user to easily understand differences in the print settings in each scene, the displayed characters may be colored or modified. The user specifies the number of copies via the operation unit 195 and the number of copies specifying buttons 981 and 986, and issues a print instruction with the print start button 940.

In step S680, the CPU 112 generates a plurality of print jobs including the print data, according to the determined print workflow processing order, based on the favorite print settings of each user or each scene.

More specifically, the CPU 112 reads the information (file) of the print workflow stored in the storage device. Then, the CPU 112 acquires the favorite print settings corresponding to each user (or each scene) one by one from the read information of the print workflow. The CPU 112 generates print jobs according to the acquired favorite print settings, and causes the printer device 300 to execute the print processing. The CPU 112 generates print jobs with respect to all favorite print settings described in the information of the print workflow. In this way, with respect to the selected job data, the plurality of print jobs to which the different print settings are reflected is generated. When the print job generation processing with respect to all favorite print settings is completed, the processing proceeds to step S690.

In step S685, the CPU 112 converts the data into print data to which the print settings set by the printer driver of the host computer 191 are reflected.

In step S690, the CPU 112 interprets the print data generated in step S645, S680, or S685 in the order of generation to perform image generation, and transmits the generated image to the printer device 300. The printer device 300 prints the received image on a sheet, and ends the processing.

By the above-described processing, a print workflow can be specified with the simple operation in performing the printing, and a plurality of print jobs (print data) to which registered different print settings are reflected can be efficiently generated. Further, since only one print job to be a base is generated as a print job generated by the printer driver, the amount of print data stored in a storage area can be reduced.

In the present exemplary embodiment, using the operating unit 150 in the printing apparatus 100, the processing for setting favorite print settings and the print workflow registration processing is performed. Alternatively, the processing for setting favorite print settings and the print workflow registration processing can be performed using the host computer 191, or a tool installed in another computer, instead of the operation unit 150.

In the present exemplary embodiment, the processing for determining a processing order in executing print processing according to a print workflow is performed at the time of registration of the print workflow in steps S340 and S370. In consideration of a change in favorite print settings for a user or a scene from the time of the registration of a print workflow to the time of the execution of the printing, the processing order determination processing in step S340 or S370 can be performed again in the processing in step S660 or S670.

In the present exemplary embodiment, all users who can use the printing apparatus 100 can perform the registration of a print workflow. In consideration of security, however, only a person having special authority (for example, a system administrator) may be allowed to perform the registration.

In the present exemplary embodiment, the information of favorite print settings is associated with a user or a scene, and registered in advance, and the information is selected as a target of a workflow. However, the present exemplary embodiment is not limited to this example. For example, the information of print settings can be registered in association with the use of a print product, a position of a person who distributes a print product, or a group.

In the present exemplary embodiment, favorite print settings corresponding to a plurality of users or a plurality of scenes are merged and registered as a "print workflow". However, the print workflow according to the present exemplary embodiment is not limited to this example. As long as a plurality of printing processes is executed according to a plurality of print settings, the plurality of print settings is included in the print workflow according to the present exemplary embodiment.

Figure 13:
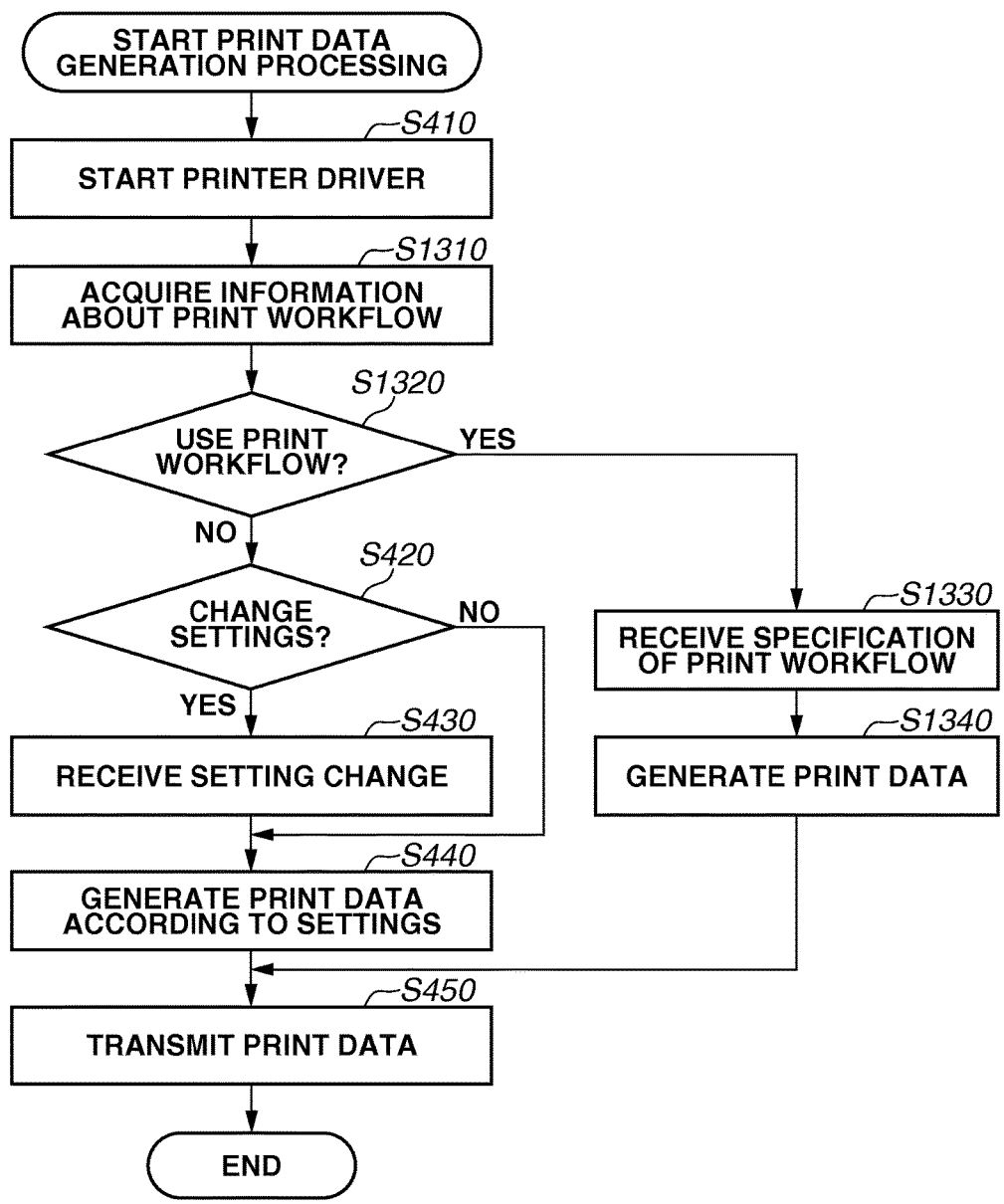
FIG. 13 is a flowchart illustrating processing when a printing apparatus performs printing according to a second exemplary embodiment.
Figure 14:
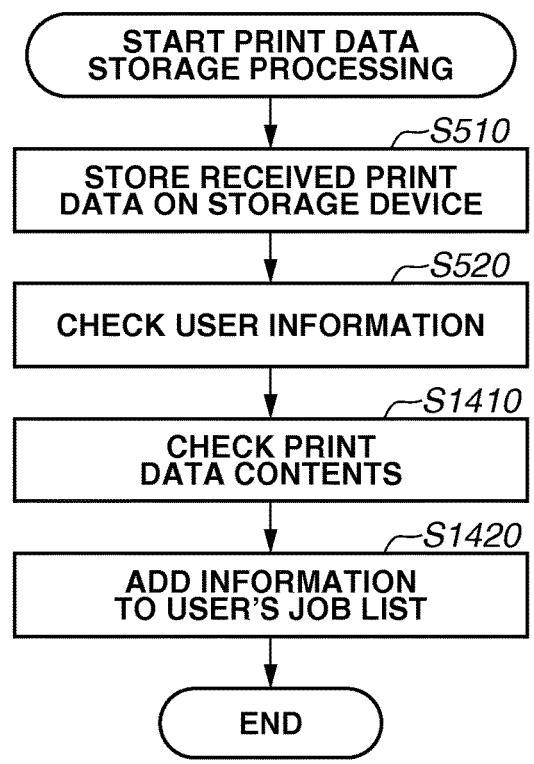
FIG. 14 is a flowchart illustrating processing for print data storing processing according to the second exemplary embodiment.

FIG. 13 illustrates a processing flow of print data generation processing by the CPU 192 in the host computer 191 according to a second exemplary embodiment. FIG. 14 illustrates a processing flow of print data storage processing by the CPU 112 in the printing apparatus 100 according to the present exemplary embodiment. FIG. 15 illustrates a processing flow of print processing by the CPU 112 in the printing apparatus 100 according to the present exemplary embodiment. The processing having the same step numbers as those in the first exemplary embodiment performs similar processing as that in the first exemplary embodiment, and the description thereof is omitted.

In step S1310, the CPU 192 inquires about a print workflow to the printing apparatus 100, and acquires the information of the print workflow stored in step S380.

In step S1320, the CPU 192 displays a screen for specifying whether to use the print workflow acquired in step S1310 on the display unit 197, and the user determines whether to use the print workflow. If the print workflow is used (YES in step S1320), the processing proceeds to S1330. On the other hand, if the print workflow is not used (NO in step S1320), the processing proceeds to step S420.

In step S1330, the CPU 192 displays the print workflow acquired in step S1320, and if there is a plurality of print workflows, receives a user's operation for specifying one of the workflows.

In step S1340, the CPU 192 adds the information of the print workflow specified in step S1330 and generates print data. At this step, the plurality of favorite print settings included in the print workflow is not reflected to the print data, and the information as parameters indicating the information of the print workflow is set. The print data generated in this step may be generated based on print settings having the largest amount of information (set as the first in the processing order) in the print settings included in the print workflow. This eliminates unnecessary information while an adequate amount of information for generating a plurality of pieces of print data as the print workflow can be ensured.

In step S1410, the CPU 112 checks the information for identifying the print data such as the name of the print data and print settings based on the print data stored in step S510. With respect to the data to which the information of the print workflow is specified, the information about the print workflow is checked, in place of the print settings.

In step S1420, the CPU 112 generates, based on the user information checked in step S520, a print job list of the user, registers the jobs, stores the information in the storage device 160, and ends the processing. The print job list includes the information of the print data names and various kinds of print settings checked in step S1410, and address information of the print data in the storage device 160 stored in step S510. With respect to the data to which the information of the print workflow is specified, the information about the print workflow is registered instead of the print settings. If the print job list of the user has already been provided, the information is added and registered at the end of the print job list.

In step S1510, the CPU 112 displays the print job list of the authenticated user on the display in the operation unit 150. With respect to the data to which the information of the print workflow is specified, the information about the print workflow is displayed, instead of the display of the print settings.

In step S1520, the CPU 112 determines whether a specification of the print workflow is included in the print data. If a specification of the print workflow is included (YES in step S1520), the processing proceeds to S650. On the other hand, if a specification of the print workflow is not included (NO in step S1520), the processing proceeds to step S690.

The above-described processing enables a specification of a print workflow in advance when generating a print job, and thus the number of operations performed in front of the printing apparatus at the time of execution of the printing can be reduced.

At least one of the functions of the above-described exemplary embodiments can be implemented by supplying a program to a system or apparatus via a network or a storage medium, and reading and executing the program by at least one processor in a computer of the system or apparatus. Alternatively, at least one of the function of the above-described exemplary embodiments can be implemented by a circuit (for example, an application-specific integrated circuit (ASIC)) implementing at least one of the functions.

While the present disclosure has been described with reference to exemplary embodiments, it is to be understood that these exemplary embodiments are not seen to be limiting.

This application claims the benefit of Japanese Patent Application No. 2014-142728, filed Jul. 10, 2014, which is hereby incorporated by reference herein in its entirety.

What is claimed is:

1. A printing apparatus capable of performing printing on a basis of print data transmitted from an information processing apparatus via a network, the printing apparatus comprising:
   a storage device;
   a display device which displays information;
   a printer which prints an image on a sheet; and
   a controller that executes instructions to:
   register two or more different sets of print settings in association with one work flow;
   store, into the storage device, a plurality of print data received from the information processing apparatus via the network;
   cause the display device to display information relating to the plurality of print data stored in the storage device;
   receive from a user a selection of a print data of the plurality of print data in response to information displayed on the display device;
   receive from the user a specifying of the registered work flow as the workflow to be used for the selected print data;
   generate a plurality of print jobs for the selected print data based on the two or more different sets of print settings registered in association with the specified work flow such that each of the two or more different sets of print settings is reflected on at least one of the plurality of print jobs for the selected print data; and
   cause the printer to perform printing based on the plurality of generated print jobs.

2. The printing apparatus according to claim 1, wherein a set of print settings corresponding to a first user and a set of print settings corresponding to a second user are stored in association with the one work flow.

3. The printing apparatus according to claim 1, wherein a set of print settings corresponding to a first scene and a set of print settings corresponding to a second scene are stored in association with the one work flow.

4. The printing apparatus according to claim 1,
wherein the controller executes the instructions to:
register a set of print settings for each user,
accept a selection of a plurality of users, and
register sets of print settings corresponding to the plurality of selected users in association with the one work flow.

5. The printing apparatus according to claim 1,
wherein the controller executes the instructions to:
register a set of print settings for each scene,
accept a selection of a plurality of scenes, and
register sets of print settings corresponding to the plurality of selected scenes in association with the one work flow.

6. The printing apparatus according to claim 5,
wherein the controller executes the instructions to:
display a screen for specifying the number of print copies for each of the plurality of scenes in a case where the two or more different sets of print settings registered in association with the specified work flow are two or more different sets of print settings corresponding to the plurality of scenes different from each other, and
cause the printer to perform printing based on the plurality of print jobs for the number of print copies specified via the screen.

7. The printing apparatus according to claim 1,
wherein the controller executes the instructions to:
determine, on a basis of content of each of the two or more different sets of print settings registered in association with the one work flow, a sequential order of processing of the two or more different sets of print settings.

8. The printing apparatus according to claim 1,
wherein the controller executes the instructions to:
display a button of the work flow on an operation unit,
wherein the work flow is specified by causing the user to operate the button.

9. The printing apparatus according to claim 1,
wherein, in a case where a plurality of print data is selected by the user, for each of the plurality of selected print data, a plurality of print jobs are generated based on the two or more different sets of print settings registered in association with the specified work flow such that each of the two or more different sets of print settings is reflected in least one of the plurality of print jobs for the selected print data.

10. The printing apparatus according to claim 1,
wherein the set of print settings includes, at least, color mode, one-sided/two-sided, and page layout.

11. A method for controlling a printing apparatus capable of performing printing on a basis of print data transmitted from an information processing apparatus via a network, the method comprising:
registering two or more different sets of print settings in association with one work flow;
storing a plurality of print data received from the information processing apparatus via the network;
receiving a selection of a stored print data of the plurality of stored print data from a user;
receiving from the user a specifying of the registered work flow as the workflow to be used for the selected print data;
generating a plurality of print jobs for the selected print data based on the two or more different sets of print settings registered in association with the specified work flow such that each of the two or more different sets of print settings is reflected on at least one of the plurality of print jobs for the selected print data; and
performing printing based on the plurality of generated print jobs.

12. The method according to claim 11,
wherein a set of print settings corresponding to a first user and a set of print settings corresponding to a second user are stored in association with the one work flow.

13. The method according to claim 11,
wherein a set of print settings corresponding to a first scene and a set of print settings corresponding to a second scene are stored in association with the one work flow.

14. The method according to claim 11, further comprising:
registering a set of print settings for each user,
accepting a selection of a plurality of users, and
registering sets of print settings corresponding to the plurality of selected users in association with the one work flow.

15. The method according to claim 11, further comprising:
registering a set of print settings for each scene,
accepting a selection of a plurality of scenes, and
registering sets of print settings corresponding to the plurality of selected scenes in association with the one work flow.

16. The method according to claim 15, further comprising:
displaying a screen for specifying the number of print copies for each of the plurality of scenes in a case where the two or more different sets of print settings registered in association with the specified work flow are two or more different sets of print settings corresponding to the plurality of scenes different from each other, and
causing the printer to perform printing based on the plurality of print jobs for the number of print copies specified via the screen.

17. The method according to claim 11, further comprising:
determining, on a basis of content of each of the two or more different sets of print settings registered in association with the one work flow, a sequential order of processing of the two or more different sets of print settings.

18. The method according to claim 11, further comprising:
displaying a button of the work flow on an operation unit,
wherein the work flow is specified by causing the user to operate the button.

19. The method according to claim 11,
wherein, in a case where a plurality of print data is selected by the user, for each of the plurality of selected print data, wherein, in a case where a plurality of print data is selected by the user, for each of the plurality of selected print data, a plurality of print jobs are generated based on the two or more different sets of print settings registered in association with the specified work flow such that each of the two or more different sets of print settings is reflected in least one of the plurality of print jobs for the selected print data.

20. The method according to claim 11,
wherein the set of print settings includes, at least, color mode, one-sided/two-sided, and page layout.

21. A non-transitory computer-readable storage medium storing instructions that, when executed, cause a computer to perform a process for controlling a printing apparatus capable of performing printing on a basis of print data transmitted from an information processing apparatus via a network, the process comprising:
- registering two or more different sets of print settings in association with one work flow;
- storing a plurality of print data received from the information processing apparatus via the network;
- receiving a selection of a stored print data of the plurality of stored print data from a user;
- receiving from the user a specifying of the registered work flow as the workflow to be used for the selected print data;
- generating a plurality of print jobs for the selected print data based on the two or more different sets of print settings registered in association with the specified work flow such that each of the two or more different sets of print settings is reflected on at least one of the plurality of print jobs for the selected print data; and
- performing printing based on the plurality of generated print jobs.

* * * * *